United States Patent
Inoue et al.

(10) Patent No.: US 12,097,747 B2
(45) Date of Patent: Sep. 24, 2024

(54) CONTROL APPARATUS FOR VEHICLE

(71) Applicant: SUBARU CORPORATION, Tokyo (JP)

(72) Inventors: Shotaro Inoue, Tokyo (JP); Yuki Ohara, Tokyo (JP); Ayaka Mino, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 298 days.

(21) Appl. No.: 17/502,767

(22) Filed: Oct. 15, 2021

(65) Prior Publication Data

US 2022/0126649 A1 Apr. 28, 2022

(30) Foreign Application Priority Data

Oct. 22, 2020 (JP) ................................. 2020-177161

(51) Int. Cl.
 *B60H 1/00* (2006.01)
 *B60S 1/02* (2006.01)
 *B60S 1/54* (2006.01)

(52) U.S. Cl.
 CPC .......... *B60H 1/00785* (2013.01); *B60S 1/023* (2013.01); *B60S 1/54* (2013.01)

(58) Field of Classification Search
 CPC ......... B60H 1/00785; B60S 1/023; B60S 1/54
 See application file for complete search history.

(56) References Cited

U.S. PATENT DOCUMENTS

| | | | |
|---|---|---|---|
| 2011/0298276 A1 | 12/2011 | Takahashi et al. | |
| 2013/0158838 A1* | 6/2013 | Yorke | B60W 10/115 701/123 |
| 2019/0077221 A1 | 3/2019 | Park et al. | |

FOREIGN PATENT DOCUMENTS

| | | | |
|---|---|---|---|
| JP | 2000-118227 A | | 4/2000 |
| JP | 2010-185435 A | | 8/2010 |
| JP | 2011-005953 A | | 1/2011 |
| JP | 2011005953 | * | 1/2011 |
| JP | 2011-196339 A | | 10/2011 |
| JP | 2011-256733 A | | 12/2011 |
| JP | 2013-010379 A | | 1/2013 |
| KR | 20110052151 A | | 5/2011 |

OTHER PUBLICATIONS

Notice of Reasons for Refusal received in corresponding Japanese Patent Application No. 2020-177161, dated Apr. 30, 2024.

* cited by examiner

*Primary Examiner* — Cao H Nguyen
(74) *Attorney, Agent, or Firm* — Rimon P.C.

(57) ABSTRACT

A control apparatus for a vehicle includes an input signal detector and a processor. The input signal detector detects an input signal that is based on a predetermined switch operation of a switch in the vehicle. The processor controls a defroster of the vehicle and an idle reduction, on the basis of the detection of the input signal performed by the input signal detector. The input signal detector includes a first detector that detects rising of the input signal that is based on the switch operation, and a second detector that detects falling of the input signal that is based on the switch operation. The processor drives the defroster on the basis of the detection of the input signal performed by the first detector, and prohibits the idle reduction on the basis of the detection of the input signal performed by the second detector.

13 Claims, 6 Drawing Sheets

CONTROL APPARATUS FOR VEHICLE

CROSS-REFERENCE TO RELATED APPLICATIONS

The present application claims priority from Japanese Patent Application No. 2020-177161 filed on Oct. 22, 2020, the entire contents of which are hereby incorporated by reference.

BACKGROUND

The technology relates to a control apparatus for a vehicle.

A vehicle such as an automobile in recent years generally performs an idle reduction during parking, stopping, or waiting at a traffic light, in order to reduce an exhaust gas and save a fuel. Some of such vehicles are adapted to stop driving of an air conditioner as well upon the idle reduction. Stopping the air conditioner, however, can lead to fogging of a windshield. To address this, Japanese Unexamined Patent Application Publication (JP-A) No. 2011-005953 proposes a control apparatus for a vehicle that stops driving of an air conditioner on the basis of execution of an automatic stop of an internal combustion engine, i.e., an idle reduction. In a case where a drive request of a defroster is set in response to an operation of a defroster switch during the automatic stop of the internal combustion engine, the control apparatus disclosed in JP-A No. 2011-005953 from then on shortens a period of stopping the driving of the air conditioner that is based on the execution of the automatic stop of the internal combustion engine.

SUMMARY

An aspect of the technology provides a control apparatus for a vehicle. The control apparatus includes an input signal detector and a processor. The input signal detector is configured to detect an input signal that is based on a predetermined switch operation of a switch in the vehicle. The processor is configured to control a defroster of the vehicle and an idle reduction, on the basis of the detection of the input signal performed by the input signal detector. The input signal detector includes a first detector configured to detect rising of the input signal that is based on the switch operation, and a second detector configured to detect falling of the input signal that is based on the switch operation. The processor is configured to drive the defroster on the basis of the detection of the input signal performed by the first detector, and prohibit the idle reduction on the basis of the detection of the input signal performed by the second detector.

An aspect of the technology provides a control apparatus for a vehicle. The control apparatus includes circuitry configured to detect rising of an input signal that is based on a predetermined switch operation of a switch in the vehicle, detect falling of the input signal that is based on the predetermined switch operation, drive a defroster of the vehicle on the basis of the detection of the rising of the input signal, and prohibit an idle reduction on the basis of the detection of the falling of the input signal.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Figure 1:
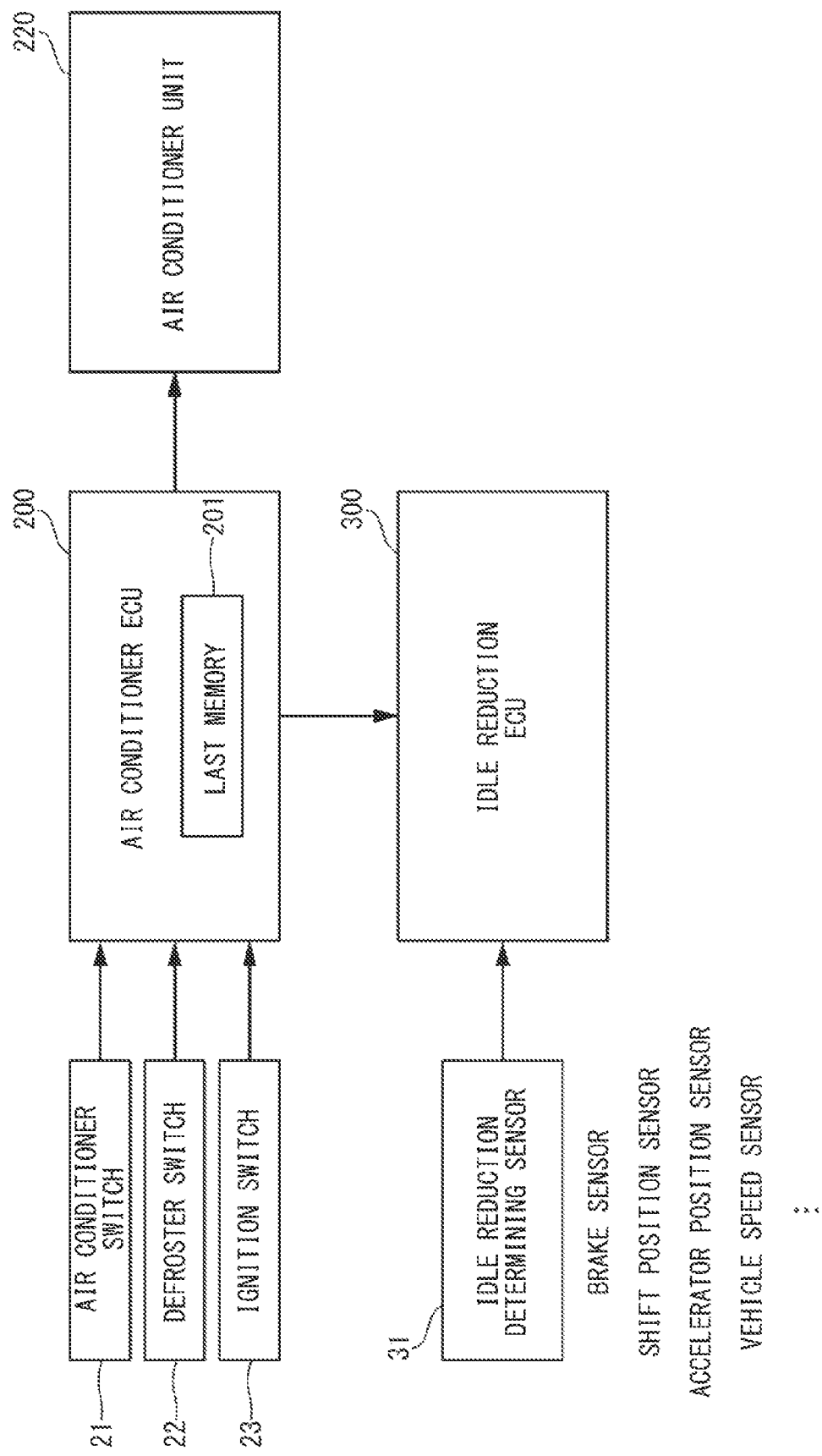
FIG. 1 is a block diagram schematically illustrating a control apparatus for a vehicle according to one example embodiment of the technology.

There is also a control apparatus for a vehicle adapted to perform a control that prohibits an idle reduction in a case where a defroster switch is operated, in consideration of a safety and to ensure window clearness of a windshield. Such a control apparatus for the vehicle performs a control that accepts the operation of the defroster switch and prohibits the idle reduction together, in response to a rising edge of the switch operation as a trigger.

The control apparatus for the vehicle adapted to perform the control in response to the rising edge of the switch operation as a trigger can involve the following example concern. For example, in a case where the defroster switch is stuck in an on state, i.e., involves an "on-fixture malfunction", the prohibition of the idle reduction can be continued against an occupant's intention. This in turn can result in an increase in an exhaust gas, i.e., involves a deterioration in the exhaust gas, upon the on-fixture malfunction of the defroster switch.

In particular, an on-board diagnostics (OBD) device has been introduced in the state of California in the year 1988, due to the escalation of air pollution primarily based on hazardous gases discharged from vehicles and with the aim of minimizing toxic substances to be discharged from the vehicles. Accordingly, the deterioration in the exhaust gas upon an occurrence of any malfunction has been recognized as a major concern and should be avoided.

To address the concerns described above, a control may be contemplated that accepts the operation of the defroster switch and prohibits the idle reduction together, in response to a falling edge of the switch operation as a trigger. This control prevents the idle reduction from being prohibited and does not involve the deterioration in the discharge gas upon the malfunction of the defroster switch accordingly, in a case where the defroster switch suffers from the on-fixture malfunction. On the other hand, this control disables an operation of the defroster, which prevents clearing of the windshield from being carried out and can make it difficult to ensure a safety.

Another method may be contemplated that requires an occupant to perform a particular operation that is different from a regular operation upon the malfunction of the defroster switch. However, this imposes an unnecessary burden on the occupant.

Accordingly, an existing control apparatus for a vehicle involves the deterioration in the exhaust gas when a safety is taken into consideration upon an occurrence of a malfunction. In contrast, the existing control apparatus for the vehicle involves an occurrence of safety concern when an attempt is made to solve the deterioration in the exhaust gas upon the occurrence of the malfunction.

It is desirable to provide a control apparatus for a vehicle that makes it possible to achieve both a prevention of a deterioration in an exhaust gas and a consideration for a safety even upon an occurrence of a malfunction and allows for an operation intended by an occupant by a regular operation without imposing an unnecessary burden on the occupant.

In the following, some example embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

First Example Embodiment

Figure 2:
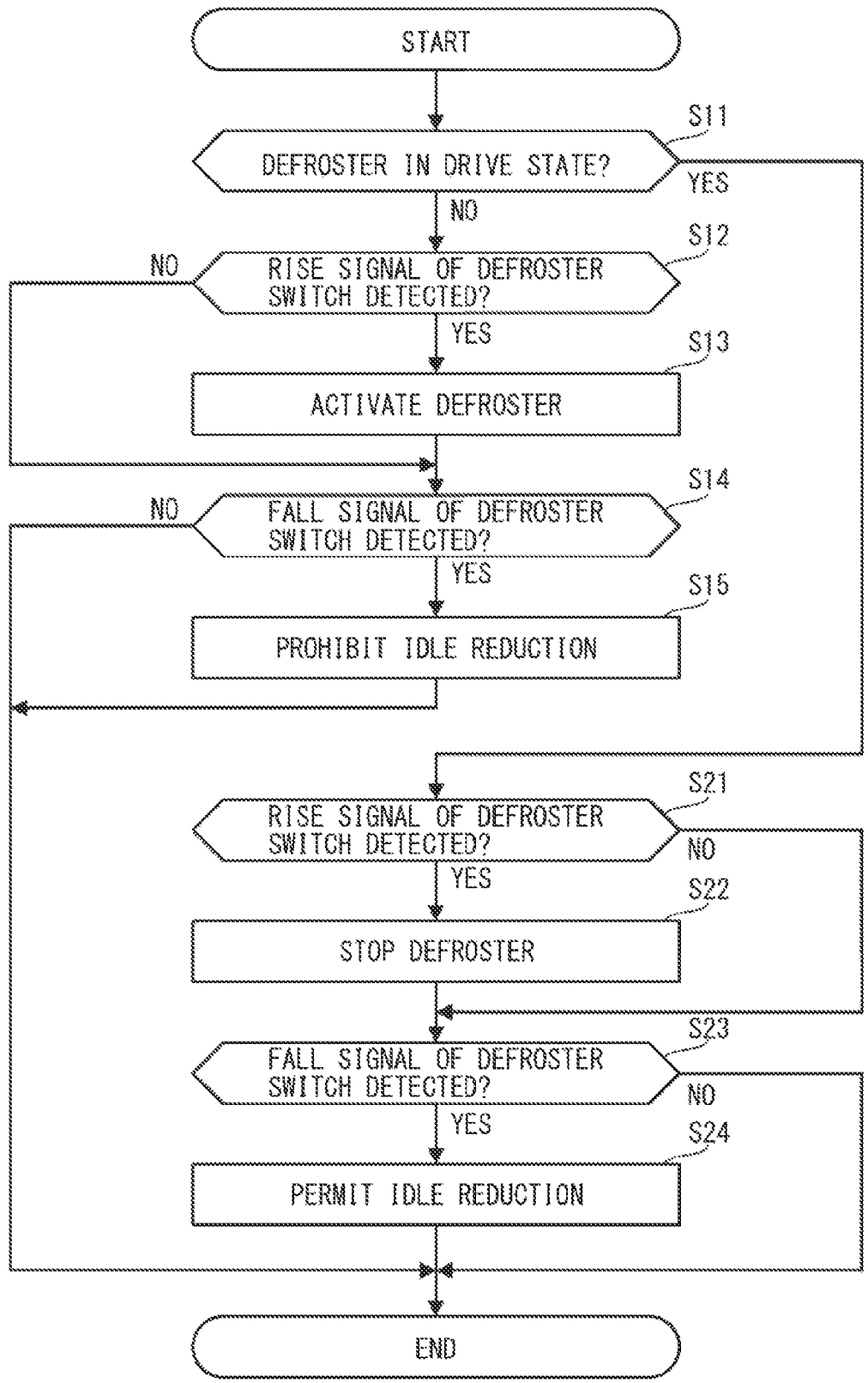
FIG. 2 is a flowchart illustrating an example of a collaborative control process between a defroster operation and an idle reduction operation according to one example embodiment of the technology.
Figure 3A:
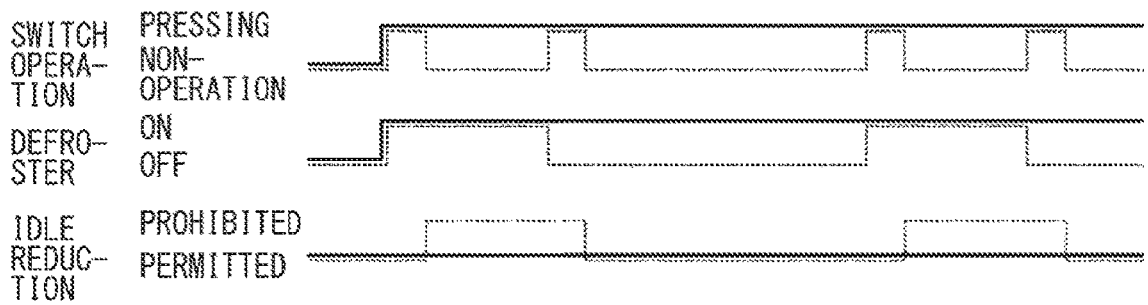
FIGS. 3A to 3C are timing charts illustrating a defroster operation signal and an idle reduction prohibition flag for a defroster switch operation according to one example embodiment and those according to comparative examples.
Figure 3B:
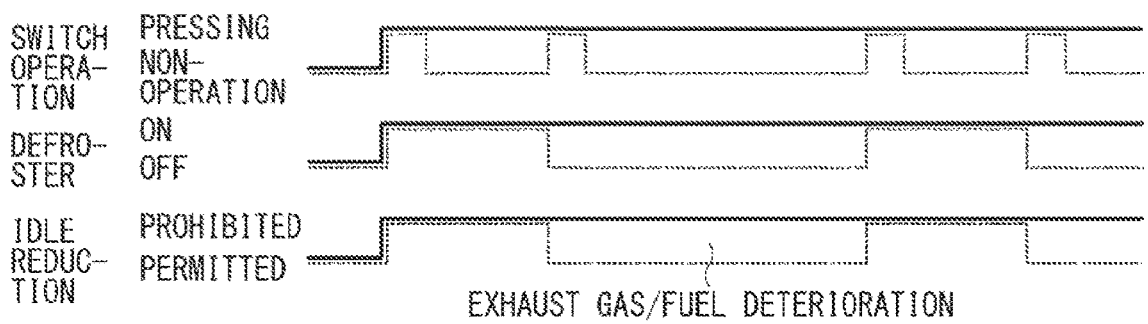
Figure 3C:
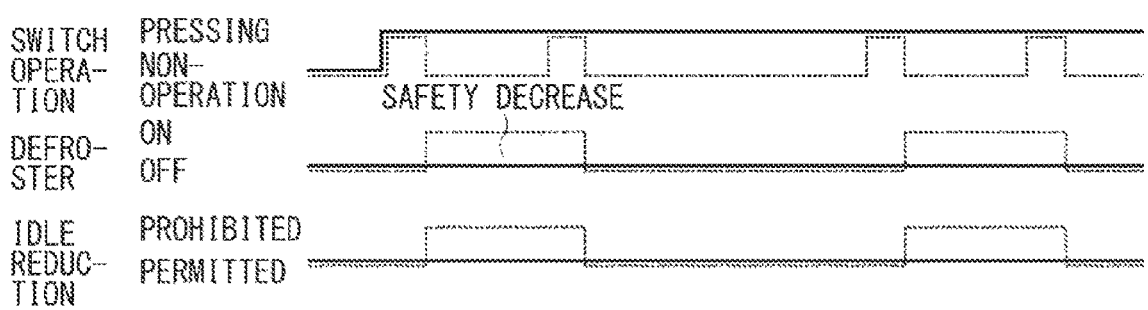

FIG. 1 is a block diagram schematically illustrating a control apparatus for a vehicle according to an example embodiment of the technology. FIG. 2 is a flowchart illustrating an example of a collaborative control process between a defroster operation and an idle reduction operation. FIGS. 3A to 3C are timing charts illustrating a defroster operation signal and an idle reduction prohibition flag for a defroster switch operation according to an example embodiment and those according to comparative examples.

Referring to FIG. 1, the vehicle includes an air conditioner ECU 200. The vehicle may also include an air conditioner unit 220 and an idle reduction ECU 300.

It should be noted that other devices including, for example: an internal combustion engine that generates power adapted to drive the vehicle; and a transmission will not be described in detail. It should be also noted that the air conditioner ECU 200 may serve as the control apparatus for the vehicle according to an example embodiment of the technology. In some embodiments, a vehicle ECU that controls the vehicle as a whole, or any other processor, may serve as the control apparatus for the vehicle.
[Air Conditioner ECU 200]
The air conditioner ECU 200 may control the air conditioner unit 220 and the idle reduction ECU 300, on the basis of signals received from an air conditioner switch 21, a defroster switch 22, an ignition switch 23, and other various sensors.

In an example embodiment, the air conditioner ECU 200 detects an input signal that is based on a switch operation of the defroster switch 22, and controls a defroster and an idle reduction on the basis of a result of the detection. The air conditioner ECU 200 detects rising of the input signal that is based on the switch operation of the defroster switch 22 to perform a drive control of the defroster. The air conditioner ECU 200 detects falling of the input signal that is based on the switch operation of the defroster switch 22 to perform a prohibition control of the idle reduction.

In some embodiments, the air conditioner ECU 200 may perform a stop control of the defroster on the basis of the detection of the rising of the input signal of the defroster switch 22 upon driving of the defroster. In some embodiments, the air conditioner ECU 200 may perform a permission control of the idle reduction on the basis of the detection of the falling of the input signal of the defroster switch 22 upon driving of the defroster.

In some embodiments, the air conditioner ECU 200 may include a last memory 201. The last memory 201 may store a state of the defroster and a state of the idle reduction that are at the time when the ignition switch 23 is turned off. In some embodiments, the last memory 201 may store an operation state (e.g., on/off state) of the defroster before the stop of the defroster and a prohibition state (e.g., prohibition/permission state) of the idle reduction.

The last memory 201 may be a rewritable non-volatile memory such as EEPROM (Electrically Erasable and Programmable Read Only Memory). The last memory 201 may be rewritable and able to store a memory content even when an engine is stopped. In some embodiments, the last memory 201 may be RAM (Random Access Memory) that temporarily holds data, and may receive a supply of electric power from a backup electric power source.

In some embodiments, the air conditioner ECU 200 may read the state of the defroster and the state of the idle reduction from the last memory 201 to cause the state of the defroster and the state of the idle reduction to be returned to their respective states that are at the time when the ignition switch 23 is turned off, in a case where the ignition switch 23 is turned on (e.g., is placed into the on state again). In other words, the air conditioner ECU 200 may take over the state of the defroster and the state of the idle reduction that are at the time when the ignition switch 23 is turned off.
[Air Conditioner Switch 21]
The air conditioner switch 21 may be provided on a front panel inside a vehicle compartment, and may be operated by an occupant. The air conditioner switch 21 may send, to the air conditioner ECU 200, an input signal as to whether to drive or stop the air conditioner unit 220, in response to an operation of the air conditioner switch 21.
[Defroster Switch 22]
The defroster switch 22 may be provided on the front panel inside the vehicle compartment, and may be operated by the occupant. The defroster switch 22 may send, to the air conditioner ECU 200, an input signal as to whether to cause the air conditioner unit 220 to drive or stop the defroster that removes fogging of a vehicle window, in response to an operation of the defroster switch 22.

It should be appreciated that the defroster switch 22 is a so-called alternate-type switch. For example, the defroster switch 22 may be placed into the on state when the defroster switch 22 is pressed once, and may retain the on state even when a hand is released from the defroster switch 22. The defroster switch 22 may be placed into the off state when the defroster switch 22 is pressed again with the defroster switch 22 being placed into the on state.

The air conditioner ECU 200 may receive a rise signal of the defroster switch 22, i.e., receive the input signal that is at the time when the defroster switch 22 is pressed. The air conditioner ECU 200 may also receive a fall signal of the defroster switch 22, i.e., receive the input signal that is at the time when a hand is released from the defroster switch 22.

It should be noted that the air conditioner ECU 200 is not able to receive the fall signal of the defroster switch 22 in a case where the defroster switch 22 malfunctions. For example, the air conditioner ECU 200 is not able to receive the fall signal of the defroster switch 22 in a case where the defroster switch 22 is stuck in an on state, i.e., involves a so-called "on-fixture", where the defroster switch 22 becomes fixed upon pressing the defroster switch 22 and the defroster switch 22 no longer returns to its original state accordingly.

[Ignition Switch 23]

The ignition switch 23 may start the internal combustion engine.

In an example embodiment, a signal of the ignition switch 23 may be directly supplied to the air conditioner ECU 200. Alternatively, the signal of the ignition switch 23 may be supplied to the vehicle ECU, and signal data of the ignition switch 23 may be supplied from the vehicle ECU to the air conditioner ECU 200.

The internal combustion engine may normally start on the basis of an operation of turning on the ignition switch 23, and may normally stop on the basis of an operation of turning off the ignition switch 23. The stop of the internal combustion engine may also include an automatic stop that automatically stops driving of the internal combustion engine irrespective of the operation of the ignition switch 23, i.e., the idle reduction. The start of the internal combustion engine may also include an automatic start in which, after the execution of the idle reduction, the driving of the internal combustion engine is resumed in response to satisfaction of a predetermined condition irrespective of the operation of the ignition switch 23.

[Air Conditioner Unit 220]

The air conditioner unit 220 may perform an air conditioning control that adjusts a temperature and a humidity inside the vehicle compartment. The air conditioner unit 220 may perform an antifogging control that removes the fogging of a vehicle window.

The air conditioner unit 220 may start driving of an air conditioner in response to a supply, from the air conditioner ECU 200, of an air conditioner on signal that is based on an operation of turning on the air conditioner switch 21. The air conditioner unit 220 may stop the driving of the air conditioner in response to a supply, from the air conditioner ECU 200, of an air conditioner off signal that is based on an operation of turning off the air conditioner switch 21. It should be noted that processes including, for example, an adjustment of air volume and an adjustment of temperature of the air conditioner unit 220 will not be described in detail.

The air conditioner unit 220 may start the driving of the defroster that removes the fogging of a vehicle window in response to a supply, from the air conditioner ECU 200, of a defroster on signal that is based on an operation of turning on the defroster switch 22. The air conditioner unit 220 may stop the driving of the defroster in response to a supply, from the air conditioner ECU 200, of a defroster off signal that is based on an operation of turning off the defroster switch 22.

In an example embodiment, the air conditioner unit 220 may perform both the air conditioning control and the antifogging control. Alternatively, for example, an air conditioner unit that performs the air conditioning control and a defroster unit that performs the antifogging control may be provided separately, and both the air conditioner unit and the defroster unit may configure a single air conditioner unit.

[Idle Reduction ECU 300]

The idle reduction ECU 300 may control the idle reduction on the basis of a signal received from an idle reduction determining sensor 31 and a signal received from the air conditioner ECU 200.

In an example embodiment, the idle reduction ECU 300 may refrain from performing the idle reduction even when a predetermined condition of establishing the idle reduction is satisfied, in a case where the idle reduction ECU 300 receives a supply of an idle reduction prohibition signal from the air conditioner ECU 200. For example, the idle reduction ECU 300 may perform the idle reduction only in a case where: the idle reduction ECU 300 receives a supply of an idle reduction permission signal from the air conditioner ECU 200; and the predetermined condition of establishing the idle reduction is satisfied.

[Idle Reduction Determining Sensor 31]

The idle reduction determining sensor 31 may output a detection signal adapted to determine whether to perform the idle reduction. For example, the idle reduction determining sensor 31 may include one or more of devices including, for example: a brake sensor that detects a booster pressure of a brake; a shift position sensor that detects a position of operation of a shift lever; an accelerator position sensor that detects an accelerator position that is based on an amount of pressing of an accelerator; and a vehicle speed sensor that detects a speed of the vehicle on the basis of a rotation speed of a wheel.

[Collaborative Control Process between Defroster Operation and Idle Reduction Operation]

A description is given next of a collaborative control process between a defroster operation and an idle reduction operation.

FIG. 2 is a flowchart illustrating an example of the collaborative control process between the defroster operation and the idle reduction operation.

The air conditioner ECU 200 may perform a collaborative control between the defroster operation and the idle reduction operation.

The air conditioner ECU 200 may perform a determining process of determining whether the defroster is in a drive state (step S11). For example, the air conditioner ECU 200 may determine whether an activation signal of activating the defroster has been sent to the air conditioner unit 220. If the air conditioner ECU 200 determines that the defroster is in the drive state (step S11: YES), the air conditioner ECU 200 may cause the process to proceed to step S21. If the air conditioner ECU 200 determines that the defroster is not in the drive state (step S11: NO), the air conditioner ECU 200 may cause the process to proceed to step S12.

Thereafter, the air conditioner ECU 200 may perform a determining process of determining whether the rise signal of the defroster switch 22 is detected (step S12). For example, the air conditioner ECU 200 may determine whether the defroster switch 22 has been pressed. If the air conditioner ECU 200 determines that the rise signal of the defroster switch 22 is detected (step S12: YES), the air conditioner ECU 200 may cause the process to proceed to step S13. If the air conditioner ECU 200 determines that the rise signal of the defroster switch 22 is not detected (step S12: NO), the air conditioner ECU 200 may cause the process to proceed to step S14.

If the air conditioner ECU 200 determines that the rise signal of the defroster switch 22 is detected (step S12: YES), the air conditioner ECU 200 may perform a process of activating the defroster (step S13). For example, the air conditioner ECU 200 may output the activation signal of activating the defroster to the air conditioner unit 220 to cause the air conditioner unit 220 to activate the defroster.

Thereafter, the air conditioner ECU 200 may perform a determining process of determining whether the fall signal of the defroster switch 22 is detected (step S14). For example, the air conditioner ECU 200 may determine whether the defroster switch 22 has been released after the pressing of the defroster switch 22. It should be noted that the air conditioner ECU 200 is not able to detect the fall signal of the defroster switch 22 in a case where the defroster switch 22 involves the on-fixture.

If the air conditioner ECU 200 determines that the fall signal of the defroster switch 22 is detected (step S14: YES), the air conditioner ECU 200 may cause the process to proceed to step S15. If the air conditioner ECU 200 determines that the fall signal of the defroster switch 22 is not detected (step S14: NO), the air conditioner ECU 200 may end the collaborative control process.

If the air conditioner ECU 200 determines that the fall signal of the defroster switch 22 is detected (step S14: YES), the air conditioner ECU 200 may perform a process of prohibiting the idle reduction (step S15). For example, the air conditioner ECU 200 may output the idle reduction prohibition signal to the idle reduction ECU 300 to prohibit the idle reduction ECU 300 from performing a process of the idle reduction.

The air conditioner ECU 200 may end the collaborative control process after performing the process of prohibiting the idle reduction.

Meanwhile, if the air conditioner ECU 200 determines that the defroster is in the drive state (step S11: YES), the air conditioner ECU 200 may perform a determining process of determining whether the rise signal of the defroster switch 22 is detected (step S21). For example, the air conditioner ECU 200 may determine whether the defroster switch 22 has been pressed. It should be noted that the rise signal of the defroster switch 22 will not be detected by the air conditioner ECU 200 even when the defroster switch 22 is pressed in a case where the defroster switch 22 already involves the on-fixture.

If the air conditioner ECU 200 determines that the rise signal of the defroster switch 22 is detected (step S21: YES), the air conditioner ECU 200 may cause the process to proceed to step S22. If the air conditioner ECU 200 determines that the rise signal of the defroster switch 22 is not detected (step S21: NO), the air conditioner ECU 200 may cause the process to proceed to step S23.

If the air conditioner ECU 200 determines that the rise signal of the defroster switch 22 is detected (step S21: YES), the air conditioner ECU 200 may perform a process of stopping the defroster (step S22). For example, the air conditioner ECU 200 may output a stop signal of stopping the defroster to the air conditioner unit 220 to cause the air conditioner unit 220 to stop the activation of the defroster.

Thereafter, the air conditioner ECU 200 may perform a determining process of determining whether the fall signal of the defroster switch 22 is detected (step S23). For example, the air conditioner ECU 200 may determine whether the defroster switch 22 has been released after the pressing of the defroster switch 22.

If the air conditioner ECU 200 determines that the fall signal of the defroster switch 22 is detected (step S23: YES), the air conditioner ECU 200 may cause the process to proceed to step S24. If the air conditioner ECU 200 determines that the fall signal of the defroster switch 22 is not detected (step S23: NO), the air conditioner ECU 200 may end the collaborative control process.

If the air conditioner ECU 200 determines that the fall signal of the defroster switch 22 is detected (step S23: YES), the air conditioner ECU 200 may perform a process of permitting the idle reduction (step S24). For example, the air conditioner ECU 200 may output the idle reduction permission signal to the idle reduction ECU 300 to permit the idle reduction ECU 300 to perform the idle reduction. In other words, the air conditioner ECU 200 may perform a process of removing the prohibition of the idle reduction in a case where the idle reduction has been prohibited.

The air conditioner ECU 200 may end the collaborative control process after performing the process of permitting the idle reduction.

Hereinafter, a description is given of behaviors of an operation of the defroster and an idle reduction prohibition flag in response to the defroster switch operation.

FIGS. 3A to 3C are timing charts illustrating a defroster operation signal and the idle reduction prohibition flag for the defroster switch operation according to an example embodiment and those according to comparative examples.

In FIGS. 3A to 3C, a broken line represents a behavior in a case where the defroster switch 22 operates normally, and a solid line represents a behavior in a case where the defroster switch 22 involves the on-fixture.

FIG. 3A is a timing chart according to an example embodiment. FIGS. 3B and 3C are timing charts according to comparative examples. FIG. 3B is a timing chart according to a comparative example A in which the operation of the defroster and the prohibition of the idle reduction are detected on the basis of the rise signal. FIG. 3C is a timing chart according to a comparative example B in which the operation of the defroster and the prohibition of the idle reduction are detected on the basis of the fall signal.

Referring to the broken line illustrated in FIG. 3A, the air conditioner ECU 200 may receive the rise signal of the defroster switch 22 in response to the operation of pressing the defroster switch 22, in a case where the defroster switch 22 operates normally. Thus, the air conditioner ECU 200 may detect the presence of an input of the operation of activating the defroster, and may output the defroster on signal, i.e., the activation signal, to the air conditioner unit 220. Accordingly, the defroster may be activated by the air conditioner unit 220.

Thereafter, the air conditioner ECU 200 may receive the fall signal of the defroster switch 22 in response to releasing of a hand of an operator from the defroster switch 22. Thus, the air conditioner ECU 200 may detect the presence of an input of the prohibition of the idle reduction, and may output the idle reduction prohibition signal to the idle reduction ECU 300. Accordingly, the idle reduction ECU 300 may prohibit the idle reduction even when a condition of setting the idle reduction is satisfied.

Thereafter, the air conditioner ECU 200 may receive the rise signal of the defroster switch 22 in response to the operation of pressing the defroster switch 22, during the operation of the defroster. Thus, the air conditioner ECU 200 may detect the presence of an operation of stopping the defroster, and may output the off signal, i.e., the stop signal, to the air conditioner unit 220. Accordingly, the defroster may be stopped by the air conditioner unit 220.

Thereafter, the air conditioner ECU 200 may receive the fall signal of the defroster switch 22 in response to releasing of a hand of an operator from the defroster switch 22. Thus, the air conditioner ECU 200 may detect the presence of an operation of permitting the idle reduction, or the removal of the prohibition of the idle reduction, and may output the idle reduction permission signal to the idle reduction ECU 300. Accordingly, the idle reduction ECU 300 may permit the idle reduction, and may perform the idle reduction in a case where the condition of setting the idle reduction is satisfied.

This may return to a state in which the defroster is stopped and the execution of the idle reduction is permitted (hereinafter referred to as an "initial state"). From then on, the operations described above may be repeated in response to the operation of pressing the defroster switch 22.

The following operations may be performed in a case where the defroster switch 22 involves the on-fixture.

Referring to the solid line illustrated in FIG. 3A, the air conditioner ECU 200 is able to receive the rise signal of the defroster switch 22 normally in response to the operation of pressing the defroster switch 22. Thus, the air conditioner ECU 200 may detect the presence of the input of the operation of activating the defroster, and may output the defroster on signal, i.e., the activation signal, to the air conditioner unit 220. Accordingly, the defroster may be activated by the air conditioner unit 220.

However, the air conditioner ECU 200 is not able to receive the fall signal of the defroster switch 22 even when a hand of an operator is released from the defroster switch 22. Hence, the air conditioner ECU 200 is not able to detect the presence of the input of the prohibition of the idle reduction, and is not able to output the idle reduction prohibition signal to the idle reduction ECU 300. Accordingly, the idle reduction ECU 300 remains in the state in which the idle reduction is permitted.

From then on, the air conditioner ECU 200 is no longer able to receive both the rise signal and the fall signal of the defroster switch 22 even when the operation of pressing the defroster switch 22 is performed. Thus, the defroster remains in the activation state and the idle reduction remains in the permitted state.

As described above, the control apparatus for the vehicle according to an example embodiment allows the defroster to be operated and helps to ensure a safety even in a case where the defroster switch 22 involves the on-fixture. Further, the control apparatus for the vehicle according to an example embodiment allows the idle reduction to be in the permitted state even in a case where the defroster switch 22 involves the on-fixture, making it possible to prevent a decrease in fuel consumption and the deterioration in the exhaust gas.

In contrast, referring to FIG. 3B, an air conditioner ECU detects the operation of the defroster and the prohibition of the idle reduction on the basis of the rise signal in the comparative example A. Thus, the air conditioner ECU detects the presence of the input of the prohibition of the idle reduction on the basis of the rise signal of the defroster switch, and outputs the idle reduction prohibition signal to an idle reduction ECU. However, the idle reduction ECU remains in the state in which the idle reduction is prohibited in a case where the defroster switch involves the on-fixture. This results in the decrease in the fuel consumption and makes it difficult to comply with emission control regulations.

Referring to FIG. 3C, in the comparative example B, an air conditioner ECU detects the operation of the defroster and the prohibition of the idle reduction on the basis of the fall signal. Thus, the air conditioner ECU detects the presence of the input of the operation of activating the defroster on the basis of the fall signal of the defroster switch, and outputs the defroster on signal to an air conditioner unit. However, the air conditioner ECU is no longer able to output the defroster on signal to the air conditioner unit and the defroster no longer operates in a case where the defroster switch involves the on-fixture. This makes it difficult to remove the fogging of a vehicle window such as the windshield and can result in a decrease in safety.

The control apparatus for the vehicle according to an example embodiment described above activates the defroster on the basis of the rise signal of the defroster switch 22 and prohibits the idle reduction on the basis of the fall signal of the defroster switch 22. Accordingly, it helps to ensure a safety without involving the decrease in the fuel consumption and the deterioration in the exhaust gas. It should be appreciated that, although comfortableness and the prevention of the decrease in the fuel consumption are important factors, ensuring a safety is most important above all.

Second Example Embodiment

A description is given next of a second example embodiment, in which the detection of the signal for the defroster and the detection of the signal for the idle reduction are made opposite to those according to the first example embodiment for the rise signal and the fall signal of the defroster switch 22 upon the operation of the defroster.

For example, in the second example embodiment, the presence of the operation of permitting the idle reduction, or the removal of the prohibition of the idle reduction, may be detected on the basis of the rise signal of the defroster switch 22 upon the operation of the defroster. Further, the presence of the operation of stopping the defroster may be detected on the basis of the fall signal of the defroster switch 22 upon the operation of the defroster.

[Collaborative Control Process between Defroster Operation and Idle Reduction Operation]

Figure 4:
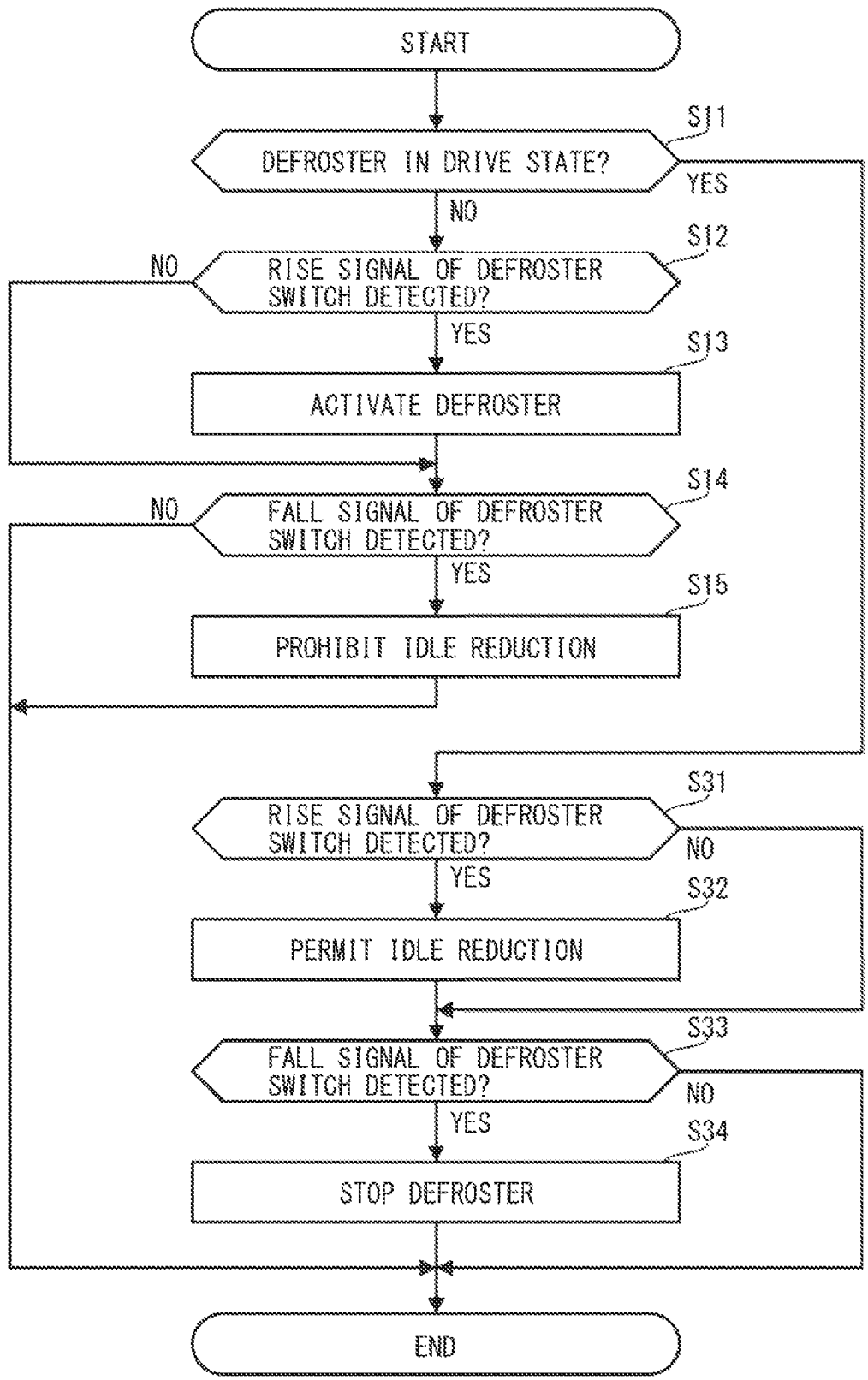
FIG. 4 is a flowchart illustrating an example of the collaborative control process between the defroster operation and the idle reduction operation according to one example embodiment of the technology.

FIG. 4 is a flowchart illustrating an example of the collaborative control process between the defroster operation and the idle reduction operation, in which the detection of the signal for the defroster and the detection of the signal for the idle reduction are made opposite to those according to the first example embodiment upon the operation of the defroster.

It should be noted that processes at the time when the defroster is stopped (steps S11 to S15) are similar to those according to the first example embodiment described above and will not be described in detail.

If the air conditioner ECU 200 determines that the defroster is in the drive state (step S11: YES), the air conditioner ECU 200 may perform a determining process of determining whether the rise signal of the defroster switch 22 is detected (step S31). For example, the air conditioner ECU 200 may determine whether the defroster switch 22 has been pressed. It should be noted that the rise signal of the defroster switch 22 will not be detected by the air conditioner ECU 200 even when the defroster switch 22 is pressed in a case where the defroster switch 22 already involves the on-fixture as described above.

If the air conditioner ECU 200 determines that the rise signal of the defroster switch 22 is detected (step S31: YES), the air conditioner ECU 200 may cause the process to proceed to step S32. If the air conditioner ECU 200 determines that the rise signal of the defroster switch 22 is not detected (step S31: NO), the air conditioner ECU 200 may cause the process to proceed to step S33.

If the air conditioner ECU 200 determines that the rise signal of the defroster switch 22 is detected (step S31: YES), the air conditioner ECU 200 may perform a process of permitting the idle reduction (step S32). For example, the air conditioner ECU 200 may output the idle reduction permission signal to the idle reduction ECU 300 to permit the idle reduction ECU 300 to perform the idle reduction. In other words, the air conditioner ECU 200 may perform a process of removing the prohibition of the idle reduction in a case where the idle reduction has been prohibited.

Thereafter, the air conditioner ECU 200 may perform a determining process of determining whether the fall signal of the defroster switch 22 is detected (step S33). For example, the air conditioner ECU 200 may determine whether the defroster switch 22 has been released after the pressing of the defroster switch 22.

If the air conditioner ECU 200 determines that the fall signal of the defroster switch 22 is detected (step S33: YES), the air conditioner ECU 200 may cause the process to proceed to step S34. If the air conditioner ECU 200 determines that the fall signal of the defroster switch 22 is not detected (step S33: NO), the air conditioner ECU 200 may end the collaborative control process.

If the air conditioner ECU 200 determines that the fall signal of the defroster switch 22 is detected (step S33: YES), the air conditioner ECU 200 may perform a process of stopping the defroster (step S34). For example, the air conditioner ECU 200 may output a stop signal of stopping the defroster to the air conditioner unit 220 to cause the air conditioner unit 220 to stop the activation of the defroster.

The air conditioner ECU 200 may end the collaborative control process after performing the process of stopping the defroster.

A description is given next of behaviors of the operation of the defroster and the idle reduction prohibition flag in response to the defroster switch operation according to the second example embodiment.

Figure 5A:
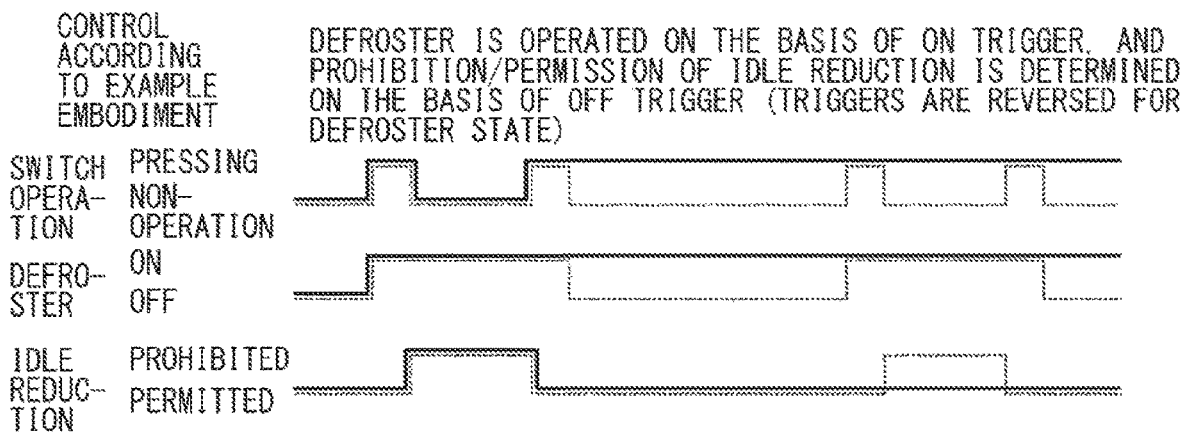
FIGS. 5A to 5C are timing charts illustrating the defroster operation signal and the idle reduction prohibition flag for the defroster switch operation according to one example embodiment and those according to comparative examples.
Figure 5B:
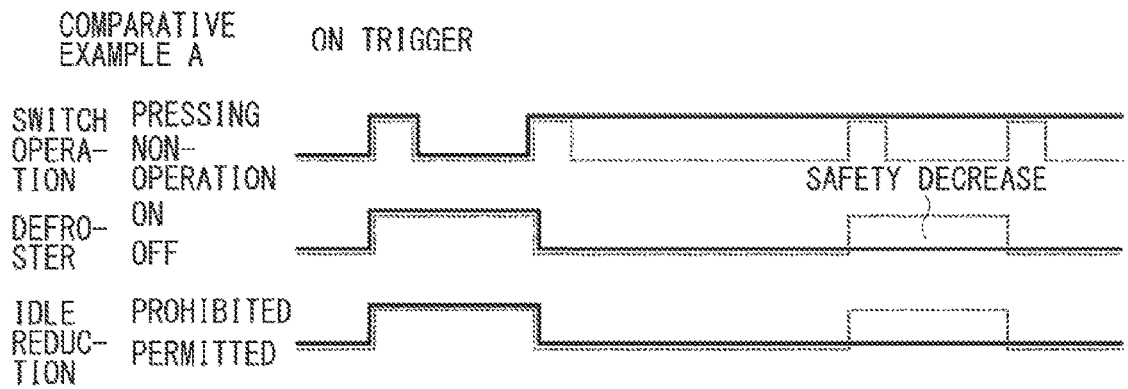
Figure 5C:
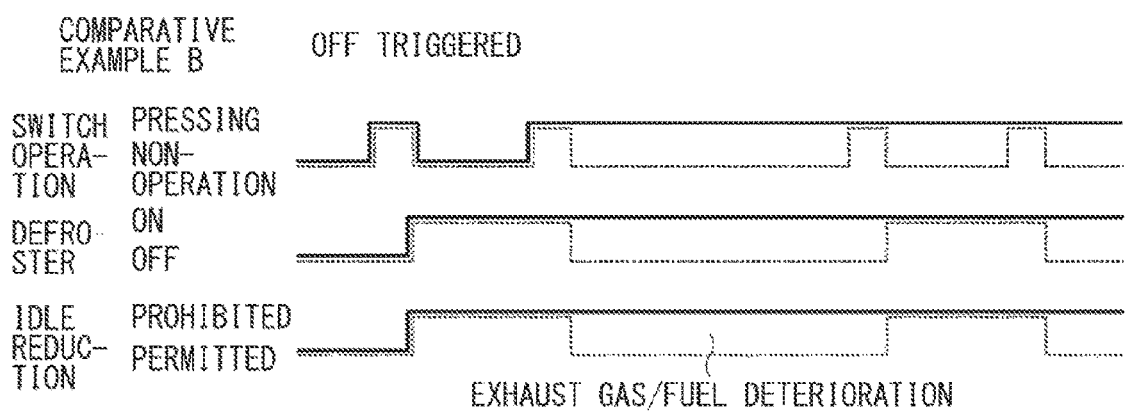

FIGS. 5A to 5C are timing charts illustrating the defroster operation signal and the idle reduction prohibition flag for the defroster switch operation according to the second example embodiment and those according to comparative examples.

In FIGS. 5A to 5C, a broken line represents a behavior in a case where the defroster switch 22 operates normally, and a solid line represents a behavior in a case where the defroster switch 22 involves the on-fixture.

FIG. 5A is a timing chart according to the second example embodiment. FIGS. 5B and 5C are timing charts according to comparative examples. FIG. 5B is a timing chart according to a comparative example A in which the operation of the defroster and the prohibition of the idle reduction are detected on the basis of the rise signal. FIG. 5C is a timing chart according to a comparative example B in which the operation of the defroster and the prohibition of the idle reduction are detected on the basis of the fall signal.

It should be noted that processes at the time when the defroster is stopped are similar to those according to the first example embodiment described above and will not be described in detail.

Referring to the broken line illustrated in FIG. 5A, the air conditioner ECU 200 may receive the rise signal of the defroster switch 22 in response to the operation of pressing the defroster switch 22, during the operation of the defroster. Thus, the air conditioner ECU 200 may detect the presence of an operation of permitting the idle reduction, or the removal of the prohibition of the idle reduction, and may output the idle reduction permission signal to the idle reduction ECU 300. Accordingly, the idle reduction ECU 300 may permit the idle reduction, and may perform the idle reduction in a case where the condition of setting the idle reduction is satisfied.

Thereafter, the air conditioner ECU 200 may receive the fall signal of the defroster switch 22 in response to releasing of a hand of an operator from the defroster switch 22. Thus, the air conditioner ECU 200 may detect the presence of an operation of stopping the defroster, and may output the off signal, i.e., the stop signal, to the air conditioner unit 220. Accordingly, the defroster may be stopped by the air conditioner unit 220.

This may return to the initial state. From then on, the operations described above may be repeated in response to the operation of pressing the defroster switch 22.

The following operations may be performed in a case where the defroster switch 22 involves the on-fixture upon the operation of releasing the defroster.

Referring to the solid line illustrated in FIG. 5A, the air conditioner ECU 200 is able to receive the rise signal of the defroster switch 22 normally in response to the operation of pressing the defroster switch 22 during the activation of the defroster. Thus, the air conditioner ECU 200 may detect the presence of the input of the permission of the idle reduction, and may output the idle reduction permission signal to the idle reduction ECU 300. Accordingly, the idle reduction ECU 300 is placed into the state in which the idle reduction is permitted.

However, the air conditioner ECU 200 is not able to receive the fall signal of the defroster switch 22 even when a hand of an operator is released from the defroster switch 22. Hence, the air conditioner ECU 200 is not able to detect the presence of the input of the operation of stopping the defroster, and is not able to output the off signal i.e., the activation stop signal, to the air conditioner unit 220. Accordingly, the defroster remains activated by the air conditioner unit 220.

From then on, the air conditioner ECU 200 is no longer able to receive both the rise signal and the fall signal of the defroster switch 22 even when the operation of pressing the defroster switch 22 is performed. Thus, the defroster remains in the activation state and the idle reduction remains in the permitted state.

As described above, the control apparatus for the vehicle according to the second example embodiment allows the defroster to be operated and helps to ensure a safety even in a case where the defroster switch 22 involves the on-fixture. Further, the control apparatus for the vehicle according to the second example embodiment allows the idle reduction to be in the permitted state even in a case where the defroster switch 22 involves the on-fixture, making it possible to prevent the decrease in fuel consumption and the deterioration in the exhaust gas.

In contrast, referring to FIG. 5B, the air conditioner ECU detects the operation of the defroster and the prohibition of the idle reduction on the basis of the rise signal in the comparative example A. Thus, the air conditioner ECU detects the presence of the input of the operation of stopping the defroster on the basis of the rise signal of the defroster switch and outputs the defroster off signal to the air conditioner unit upon the operation of the defroster. Accordingly, the air conditioner ECU is no longer able to output the defroster on signal to the air conditioner unit and the defroster no longer operates when attempting to activate the defroster at next time, in a case where the defroster switch involves the on-fixture. This makes it difficult to remove the fogging of a vehicle window such as the windshield and can result in a decrease in safety.

Referring to FIG. 5C, in the comparative example B, the air conditioner ECU detects the operation of the defroster and the prohibition of the idle reduction on the basis of the fall signal. Thus, the air conditioner ECU detects the presence of the input of the permission of the idle reduction on the basis of the fall signal of the defroster switch and outputs the idle reduction permission signal to the idle reduction ECU upon the operation of the defroster. Accordingly, the idle reduction ECU remains in the state in which the idle reduction is prohibited in a case where the defroster switch involves the on-fixture. This results in the decrease in the fuel consumption and makes it difficult to comply with emission control regulations.

The control apparatus for the vehicle according to the second example embodiment described above permits the idle reduction on the basis of the rise signal of the defroster switch 22 and stops the defroster on the basis of the fall signal of the defroster switch 22 upon the activation of the defroster. Accordingly, it helps to ensure a safety without involving the decrease in the fuel consumption and the deterioration in the exhaust gas.

Third Example Embodiment

A description is given next of a third example embodiment in which a state of the defroster and a state of the idle reduction are taken over even when the ignition is turned off.

In the third example embodiment, the last memory 201 may store the current state of the defroster and the current state of the idle reduction in a case where the ignition is turned off.

The air conditioner ECU 200 may read the state of the defroster and the state of the idle reduction from the last memory 201 to take over the state of the defroster and the state of the idle reduction that are at the time before the ignition is turned off, in a case where the ignition is turned on again.

Figure 6A:
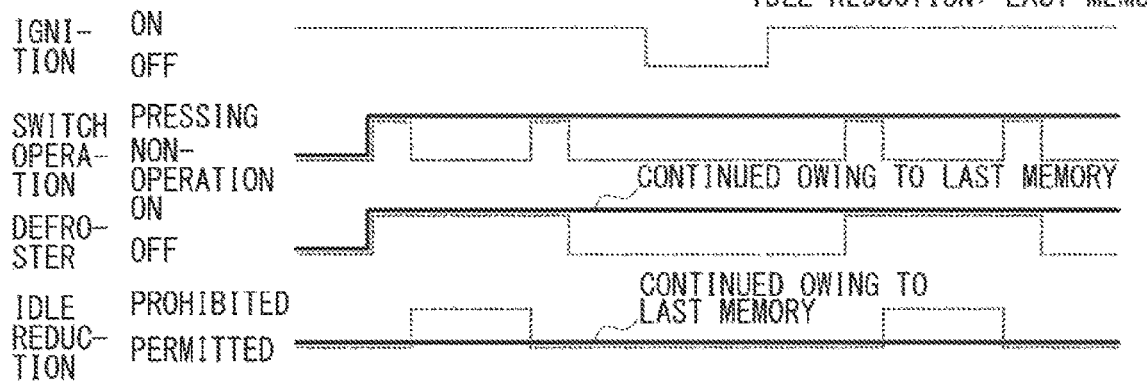
FIGS. 6A and 6B are timing charts illustrating the defroster operation signal and the idle reduction prohibition flag for the defroster switch operation according to one example embodiment and those according to a comparative example.
Figure 6B:
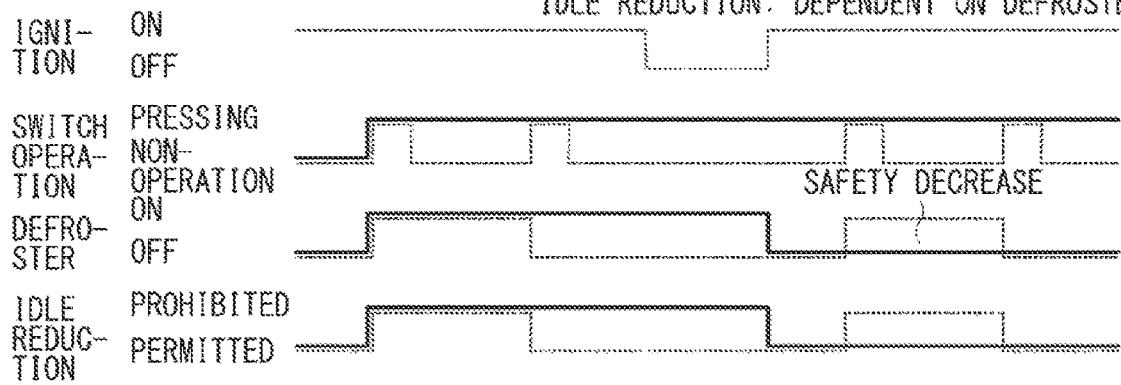

FIGS. 6A and 6B are timing charts illustrating the defroster operation signal and the idle reduction prohibition flag for the defroster switch operation according to the third example embodiment and those according to a comparative example.

In FIGS. 6A and 6B, a broken line represents a behavior in a case where the defroster switch 22 operates normally, and a solid line represents a behavior in a case where the defroster switch 22 involves the on-fixture.

FIG. 6A is a timing chart according to the third example embodiment. FIG. 6B is a timing chart according to a comparative example in which the operation of the defroster is turned off on the basis of turning on of the ignition.

Referring to the broken line illustrated in FIG. 6A, the defroster may be in the off state and the idle reduction may be in the permitted state when the ignition is turned on again after the ignition is turned off with the defroster being turned off, in a case where the defroster switch 22 operates normally.

Under such circumstances, the defroster may be turned on in response to the rise signal and the ide reduction may be placed into the prohibited state in response to the fall signal, in a case where the operation of pressing the defroster switch 22 is performed. Thereafter, the idle reduction may be placed into the permitted state in response to the rise signal and the defroster may be placed into the off state in response to the fall signal, in a case where the defroster switch 22 is operated again.

The following operations may be performed in a case where the defroster switch 22 involves the on-fixture.

Referring to the solid line illustrated in FIG. 6A, the defroster is turned on in response to the rise signal, in a case where the operation of pressing the defroster switch 22 is performed.

In addition, the air conditioner ECU 200 is not able to receive the fall signal of the defroster switch 22 even when a hand of an operator is released from the defroster switch 22. Hence, the air conditioner ECU 200 is not able to detect the presence of the input of the prohibition of the idle reduction. Accordingly, the idle reduction ECU 300 remains in the state in which the idle reduction is permitted.

From then on, the air conditioner ECU 200 is no longer able to receive both the rise signal and the fall signal of the defroster switch 22 even when the operation of pressing the defroster switch 22 is performed. Thus, the defroster remains in the activation state and the idle reduction remains in the permitted state.

The last memory 201 stores the states upon the turning off of the ignition switch in a case where the ignition switch is turned off. For example, the last memory 201 may store the state in which the defroster is turned on and the state in which the idle reduction is permitted.

Thereafter, the state of the defroster and the state of the idle reduction are read individually from the last memory 201 when the ignition is turned on again and are taken over accordingly.

Thus, the defroster is activated and the idle reduction is permitted as well even when the defroster switch 22 involves the on-fixture, making it possible to prevent the deterioration in the exhaust gas.

In contrast, referring to FIG. 6B, the defroster is turned off upon restarting of the ignition in a comparative example. Further, the idle reduction is caused to make the transition to the state in which the idle reduction is permitted on the basis of the state of the defroster, in order to avoid a situation in which the prohibition of the idle reduction continues upon an occurrence of a malfunction.

It should be appreciated that the defroster is turned off upon restarting the ignition, in a case where the defroster switch involves the on-fixture. Accordingly, no signal is accepted even when attempting to activate the defroster after the restarting of the ignition, which can result in a decrease in safety.

The control apparatus for the vehicle according to the third example embodiment described above stores the state of the defroster and the state of the idle reduction in the last memory upon turning off of the ignition, and allows the states that are at the time when the ignition is turned off to be continued upon restarting the ignition. Accordingly, it helps to ensure a safety. It should be appreciated that ensuring such a safety is most important above all as described above.

In one embodiment, the air conditioner ECU 200 may serve as an "input signal detector" and a "processor". In one embodiment, the air conditioner ECU 200 may serve as a "turn-on-edge detector" and a "turn-off-edge detector".

In one embodiment, the last memory 201 may serve as a "before-stop state storage".

According to at least one embodiment of the technology, it is possible to provide a control apparatus for a vehicle that makes it possible to achieve both a prevention of a deterioration in an exhaust gas and a consideration for a safety even upon an occurrence of a malfunction and allows for an operation intended by an occupant by a regular operation without imposing an unnecessary burden on the occupant.

Although some example embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The air conditioner ECU 200 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the air conditioner ECU 200. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the air conditioner ECU 200 illustrated in FIG. 1.

The invention claimed is:

1. A control apparatus for a vehicle, the control apparatus comprising:
an input signal detector configured to detect a rising edge and a falling edge of an input signal generated in response to a predetermined switch operation of a switch in the vehicle, the input signal becoming a high level in response to the switch being pressed and becoming a low level in response to the switch not being pressed, the rising edge representing the input signal at which the input signal becomes the high level from the low level, the falling edge representing the input signal at which the input signal becomes the low level from the high level; and
a processor configured to:
activate a defroster of the vehicle in response to the input signal detector detecting the rising edge while the defroster is deactivated; and
disable an idle-stop function of the vehicle in response to the input signal detector detecting the falling edge while the defroster is activated.

2. The control apparatus for the vehicle according to claim 1, wherein the processor is configured to:
deactivate the defroster in response to the input signal detector detecting the rising edge while the defroster is activated; and
enable the idle-stop function in response to the input signal detector detecting the falling edge while the defroster is deactivated.

3. The control apparatus for the vehicle according to claim 1, wherein the processor is configured to:
enable the idle-stop function in response to the input signal detector detecting the rising edge while the defroster is activated; and
deactivate the defroster in response to the input signal detector detecting the falling edge while the idle-stop function is enable.

4. The control apparatus for the vehicle according to claim 1, further comprising a storage configured to store, before an ignition is turned off, a state of the defroster and a state of the idle-stop function, the state of the defroster indicating whether the defroster is activated or deactivated, the state of the idle-stop function indicating whether the idle-stop function is enable or disabled, wherein
the processor is configured to cause the state of the defroster and the state of the idle-stop function to be returned to their respective states that are stored in the storage, in a case where the ignition is turned on again.

5. The control apparatus for the vehicle according to claim 2, further comprising a storage configured to store, before an ignition is turned off, a state of the defroster and a state of the idle-stop function, the state of the defroster indicating whether the defroster is activated or deactivated, the state of the idle-stop function indicating whether the idle-stop function is enabled or disabled, wherein
the processor is configured to cause the state of the defroster and the state of the idle-stop function to be returned to their respective states that are stored in the storage, in a case where the ignition is turned on again.

6. The control apparatus for the vehicle according to claim 3, further comprising a storage configured to store, before an ignition is turned off, a state of the defroster and a state of the idle-stop function, the state of the defroster indicating whether the defroster is activated or deactivated, the state of the idle-stop function indicating whether the idle-stop function is enabled or disabled, wherein
the processor is configured to cause the state of the defroster and the state of the idle-stop function to be returned to their respective states that are stored in the storage, in a case where the ignition is turned on again.

7. A control apparatus for a vehicle, the control apparatus comprising
circuitry configured to
detect a rising edge and a falling edge of an input signal generated in response to a predetermined switch operation of a switch in the vehicle, the input signal becoming a high level in response to the switch being pressed and becoming a low level in response to the switch not being pressed, the rising edge representing the input signal at which the input signal becomes the high level from the low level, the falling edge representing the input signal at which the input signal becomes the low level from the high level; and
activate a defroster of the vehicle in response to detecting the rising edge while the defroster is deactivated; and
disable an idle-stop function of the vehicle in response to detecting the falling edge while the defroster is activated.

8. A control apparatus for a vehicle, the control apparatus comprising circuitry configured to:
detect a rising edge and a falling edge of an input signal generated in response to a predetermined switch operation of a switch in the vehicle, the input signal becoming high level in response to the switch being pressed and becoming low level in response to the switch not being pressed, the rising edge representing the input signal at which the input signal becomes the high level from the low level, the falling edge representing the input signal at which the input signal becomes the low level from the high level; and activate a defroster of the vehicle in response to detecting the rising edge while the defroster is deactivated; and disable an idle-stop function of the vehicle in response to detecting the falling edge while i) the defroster is activated and ii) the idle-stop function is enabled.

9. The control apparatus for the vehicle according to claim 8, wherein the circuitry is configured to:

deactivate the defroster in response to detecting the rising edge while the defroster is activated; and enable the idle-stop function in response to detecting the falling edge while i) the defroster is deactivated and ii) the idle-stop function is disabled.

10. The control apparatus for the vehicle according to claim 8, wherein the circuitry is configured to:

enable the idle-stop function in response to detecting the rising edge while i) the defroster is activated and ii) the idle-stop function is disabled; and deactivate the defroster in response to detecting the falling edge while the defroster is activated.

11. The control apparatus for the vehicle according to claim 8, further comprising a storage configured to store, before an ignition is turned off, a state of the defroster and a state of the idle-stop function, the state of the defroster indicating whether the defroster is activated or deactivated, the state of the idle-stop function indicating whether the idle-stop function is enabled or disabled, wherein the circuitry is configured to cause the state of the defroster and the state of the idle-stop function to be returned to their respective states that are stored in the storage, in a case where the ignition is turned on again.

12. The control apparatus for the vehicle according to claim 9, further comprising a storage configured to store, before an ignition is turned off, a state of the defroster and a state of the idle-stop function, the state of the defroster indicating whether the defroster is activated or deactivated, the state of the idle-stop function indicating whether the idle-stop function is enabled or disabled, wherein the circuitry is configured to cause the state of the defroster and the state of the idle-stop function to be returned to their respective states that are stored in the storage, in a case where the ignition is turned on again.

13. The control apparatus for the vehicle according to claim 10, further comprising a storage configured to store, before an ignition is turned off, a state of the defroster and a state of the idle-stop function, the state of the defroster indicating whether the defroster is activated or deactivated, the state of the idle-stop function indicating whether the idle-stop function is enabled or disabled, wherein the circuitry is configured to cause the state of the defroster and the state of the idle-stop function to be returned to their respective states that are stored in the storage, in a case where the ignition is turned on again.

* * * * *